US010365647B2

(12) United States Patent
Asghar et al.

(10) Patent No.: US 10,365,647 B2
(45) Date of Patent: Jul. 30, 2019

(54) ENSURING OCCUPANT AWARENESS IN VEHICLES

(71) Applicant: QUALCOMM Incorporated, San Diego, CA (US)

(72) Inventors: Ziad Asghar, San Diego, CA (US); Regan Blythe Towal, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 15/472,822

(22) Filed: Mar. 29, 2017

(65) Prior Publication Data

US 2018/0284764 A1 Oct. 4, 2018

(51) Int. Cl.
*G05D 1/00* (2006.01)
*B60W 40/08* (2012.01)
*B60W 50/14* (2012.01)
*B60W 50/16* (2012.01)
(Continued)

(52) U.S. Cl.
CPC ........... *G05D 1/0061* (2013.01); *B60W 40/08* (2013.01); *B60W 50/0097* (2013.01); *B60W 50/14* (2013.01); *B60W 50/16* (2013.01); *G01C 21/3676* (2013.01); *G05D 1/0088* (2013.01); *B60W 2050/143* (2013.01); *B60W 2050/146* (2013.01)

(58) Field of Classification Search
CPC ............... G05D 1/0061; G05D 1/0088; G01C 21/3676; B60W 50/14; B60W 40/08; B60W 50/16; B60W 2050/146; B60W 2050/143
See application file for complete search history.

(56) References Cited

U.S. PATENT DOCUMENTS 8,718,861 B1 5/2014 Montemerlo et al.
8,874,301 B1 10/2014 Rao et al.
2015/0070160 A1 3/2015 Davidsson et al.
(Continued)

FOREIGN PATENT DOCUMENTS

DE 102014009985 A1 1/2016
DE 102014213959 A1 1/2016
(Continued)

OTHER PUBLICATIONS

Krafka K., et al., "Eye Tracking for Everyone", May 5, 2016, 9 pp.
(Continued)

*Primary Examiner* — Yuen Wong
(74) *Attorney, Agent, or Firm* — Shumaker & Sieffert, P.A.

(57) ABSTRACT

In general, techniques are described for ensuring occupant awareness in vehicles. A device comprising a processor may be configured to perform the techniques. The processor may be configured to determine an event which will change an operating characteristic of the vehicle, and determine an extent of time remaining until an estimated occurrence of the expected event. The processor may also be configured to determine a process by which to inform the occupant of an operating context of the vehicle based on the determined extent of time remaining until the estimated occurrence the expected event, and perform the process by which to inform the occupant of the operating context of the vehicle. The device may also include a memory configured to store the process.

24 Claims, 7 Drawing Sheets

(51) Int. Cl.
 *G01C 21/36* (2006.01)
 *B60W 50/00* (2006.01)

(56) References Cited

U.S. PATENT DOCUMENTS

2016/0041553 A1 2/2016 Sato et al.
2017/0110022 A1* 4/2017 Gulash .................. G09B 9/052

FOREIGN PATENT DOCUMENTS

| DE | 102014214078 A1 | 1/2016 |
| DE | 102014214777 A1 | 1/2016 |
| DE | 102014225562 A1 | 6/2016 |
| DE | 102015205580 A1 | 9/2016 |
| WO | 2014165681 A1 | 10/2014 |

OTHER PUBLICATIONS

Kim N., et al., "Vision-Based Eye-Gaze Tracking for Human Computer Interface", Department of Information and Communications, Kwangju Institute of Science and Technology, Oct. 12-15, 1999 IEEE, 6 pp.
International Search Report and Written Opinion—PCT/US2018/015758—ISA/EPO—dated Oct. 1, 2018
Partial International Search Report—PCT/US2018/015758—ISA/EPO—dated Jun. 7, 2018.

* cited by examiner

ENSURING OCCUPANT AWARENESS IN VEHICLES

TECHNICAL FIELD

This disclosure relates to vehicles and, particularly, to restoring occupant awareness in vehicles.

BACKGROUND

Vehicles are increasingly becoming more autonomous. That is, vehicles are beginning to perform tasks that an occupant would normally perform without any occupant interaction. Levels of autonomy for vehicles have been defined with level zero generally indicating no automation up to level four or five, which may refer to a fully autonomous vehicle where an individual need only specify a destination to which the fully autonomous vehicle is to drive.

Currently, most production vehicles fall between levels zero and five. Mid-level (e.g., levels two through three) autonomous vehicles may perform some tasks normally performed by an occupant when operating the vehicle using adaptive cruise control, providing lane monitoring, and performing automated crash avoidance (usually by applying the brakes), etc.

In mid-level autonomous vehicles and even in fully autonomous (e.g., level four or five) vehicles, when problems arise for which the vehicle is not equipped to handle, the autonomous vehicle may transition control of the vehicle back to the occupant. The occupant may then operate the vehicle until the problem has been overcome.

SUMMARY

In general, the disclosure describes techniques for restoring occupant awareness in autonomous vehicles such that the occupant can resume operation of the vehicle, e.g., when problems arise for which the vehicle is not equipped to handle.

In one example, the disclosure describes a method of providing information to ensure occupant awareness in a vehicle, the method comprising determining, by one or more processors, an expected event which will change an operating characteristic of the vehicle, and determining, by one or more processors, an extent of time remaining until an estimated occurrence of the expected event. The method also comprises selecting, by the one or more processors, a process of a plurality of processes by which inform the occupant of an operating context of the vehicle based on the determined extent of time remaining until the estimated occurrence of the expected event, and performing, by the one or more processors, the process by which to inform the occupant of the operating context of the vehicle.

In one example, the disclosure describes a device configured to provide information to ensure occupant awareness in a vehicle, the device comprising one or more processors configured to determine an expected event which will change an operating characteristic of the vehicle, and determine an extent of time remaining until an estimated occurrence of the expected event. The one or more processors are further configured to determine a process by which to inform the occupant of an operating context of the vehicle based on the determined extent of time remaining until the estimated occurrence the expected event, and perform the process by which to inform the occupant of the operating context of the vehicle. The device may also include a memory configured to store the process.

In one example, the disclosure describes a device configured to provide information to ensure occupant awareness in a vehicle, the device comprising means for determining an expected event which will change an operating characteristic of the vehicle, and means for determining an extent of time remaining until an estimated occurrence of the expected event. The device further comprises means for determining a process by which to inform the occupant of an operating context of the vehicle based on the determined extent of time remaining until the estimated occurrence of the expected event, and means for performing the process by which to inform the occupant of the operating context of the vehicle.

In one example, the disclosure describes a non-transitory computer-readable storage medium having stored thereon instructions that, when executed, cause one or more processors to determine an expected event which will change an operating characteristic of the vehicle, determine an extent of time remaining until an estimated occurrence of the expected event, determine a process by which to inform the occupant of an operating context of the vehicle based on the determined extent of time remaining until the estimated occurrence of the expected event, and perform the process by which to inform the occupant of the operating context of the vehicle.

The details of one or more examples are set forth in the accompanying drawings and the description below. Other features, objects, and advantages will be apparent from the description, drawings, and claims.

DETAILED DESCRIPTION

As an occupant of an autonomous vehicle becomes less involved in the operation of the vehicle, the occupant may become distracted and/or complacent, spending no more time on driving tasks than is necessary. However, autonomous vehicles may transfer control of the vehicle to the occupant. For example, an autonomous vehicle may transfer control of the vehicle to the occupant when problems occur for which the autonomous vehicle is not equipped to handle. The occupant assuming control may be referred to as a "primary occupant" as this occupant is primarily responsible for assuming control, e.g., when the autonomous vehicle may no longer safely autonomously control the vehicle.

Transitioning control of the autonomous vehicle to the primary occupant may occur suddenly, such as when equipment used to provide the automation fails due to weather, malfunction and the like. Sudden transitions of control to a potentially distracted primary occupant may not give the primary occupant time to regain sufficient context in which to safely operate the vehicle.

Various aspect of the techniques set forth in this disclosure may facilitate restoring occupant awareness in autonomous vehicles when the vehicle has automated some aspect of the driving. The techniques may ensure (or, in some instances, restore) occupant awareness by providing information to the occupant so that the primary occupant and potentially other occupants may monitor the current driving context should the primary occupant be suddenly (e.g., within minutes or, in some instances, seconds) put in control of the vehicle. Such driving context may allow the primary occupant to more safely operate the vehicle upon receiving sudden control.

In some examples, various aspects of the techniques may tailor restoration of occupant awareness based on various criteria. For example, the techniques may restore occupant awareness based on time to transition (or, in other words, handoff of) control of the autonomous vehicle, the current state of the occupant, or a condition triggering the handoff event or any combination of the time to handoff, the state of the occupant, and the type of condition trigging the handoff event.

Figure 1:
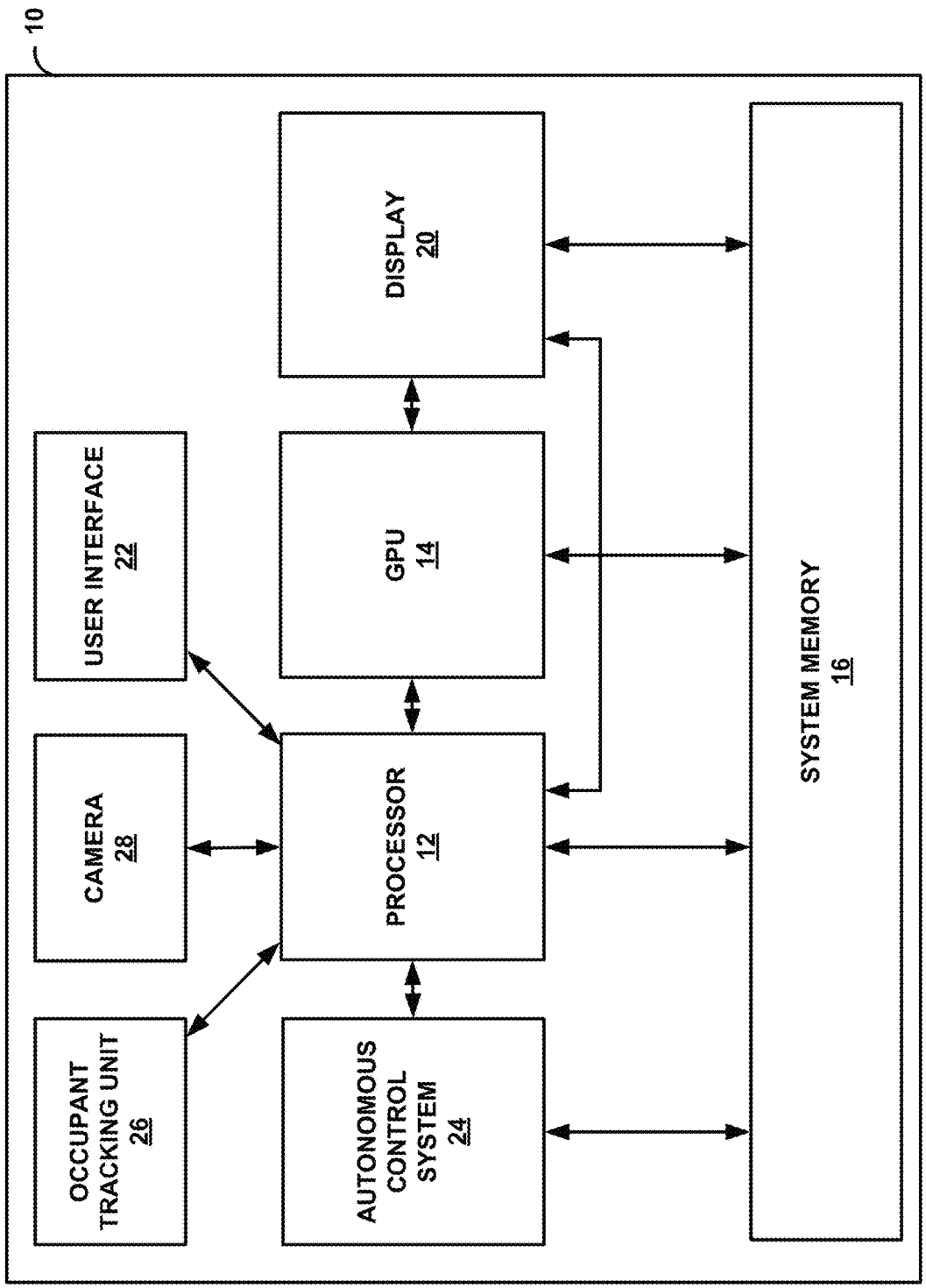
FIG. 1 is a block diagram illustrating an example autonomous vehicle configured to perform various aspects of the occupant awareness techniques described in this disclosure.

FIG. 1 is a block diagram illustrating components of an example autonomous vehicle 10 configured to perform various aspects of the occupant awareness techniques described in this disclosure. In the example of FIG. 1, autonomous vehicle 10 may represent a vehicle configured to automate one or more tasks associated with operation of vehicle 10, including automating most if not all of the tasks associated with operation of vehicle 10 such that an occupant need not, under most conditions, maintain awareness of a context in which vehicle 10 is operating.

Autonomous vehicle 10 is assumed in the description below to be an automobile. However, the techniques described in this disclosure may apply to any type of vehicle capable of conveying one or more occupants and being autonomously operated, such as a motorcycle, a bus, a recreational vehicle (RV), a semi-trailer truck, a tractor or other type of farm equipment, a train, a plane, a helicopter, a drone, a personal transport vehicle, and the like.

In the example of FIG. 1, autonomous vehicle 10 includes a processor 12, a graphics processing unit (GPU) 14, and system memory 16. In some examples, processor 12, and GPU 14 may be formed as an integrated circuit (IC). For example, the IC may be considered as a processing chip within a chip package, and may be a system-on-chip (SoC).

Examples of processor 12, and GPU 14 may include fixed function processing circuitry and/or programmable processing circuitry, and may include, but not be limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of autonomous vehicle 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

Processor 12 may execute various types of applications. Examples of the applications include navigation applications, vehicle control applications, scheduling application, safety applications, web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing based on instructions or commands that processor 12 transmits to GPU 14.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for vehicle 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 to perform various aspects of the functions ascribed in this disclosure to processor 12. Accordingly, system memory 16 may be a computer-readable storage medium having instructions stored thereon that, when executed, cause one or more processors (e.g., processor 12) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from autonomous vehicle 10, and moved to another device. As another example, memory, substantially similar to system memory 16, may be inserted into autonomous vehicle 10. In certain examples, a non-transitory storage medium may store data that can, over time, change (e.g., in RAM).

As further shown in the example of FIG. 1, autonomous vehicle 10 may include a display 20 and a user interface 22. Display 20 may represent any type of passive reflective screen on which images can be projected, or an active reflective, emissive, or transmissive display capable of projecting images (such as a light emitting diode (LED) display, an organic LED (OLED) display, liquid crystal display (LCD), or any other type of active display). Although shown as including a single display 20, autonomous vehicle 10 may include a plurality of displays that may be positioned throughout the cabin of autonomous vehicle 10. In some examples, passive versions of display 20 or certain types of active versions of display 20 (e.g., OLED displays) may be integrated into seats, tables, roof liners, flooring, windows (or, in vehicles with no windows or few windows, walls) or other aspects of the cabin of autonomous vehicles. When display 20 represents a passive display, display 20 may also include a projector or other image projection device capable of projecting or otherwise recreating an image on passive display 20.

Display 20 may also represent displays in wired or wireless communication with autonomous vehicle 10. Display 20 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of, or in place of, a display integrated into autonomous vehicle 10.

User interface 22 may represent any type of physical or virtual interface with which a user may interface to control various functionalities of autonomous vehicle 10. User interface 22 may include physical buttons, knobs, sliders or other physical control implements. User interface 22 may also include a virtual interface whereby an occupant of autonomous vehicle 10 interacts with virtual buttons, knobs, sliders or other virtual interface elements via, as one example, a touch-sensitive screen, or via a touchless interface. The occupant may interface with user interface 22 to control one or more of a climate within autonomous vehicle 10, audio playback by autonomous vehicle 10, video playback by autonomous vehicle 10, transmissions (such as cellphone calls, video conferencing calls, and/or web conferencing calls) through autonomous vehicle 10, or any other operation capable of being performed by autonomous vehicle 10.

User interface 22 may also represent interfaces extended to display 20 when acting as an extension of, or in place of, a display integrated into autonomous vehicle 10. That is, user interface 22 may include virtual interfaces presented via the above noted HUD, augmented reality computing device, virtual reality computing device or display, tablet computer, or any other of the different types of extended displays listed above.

In the context of autonomous vehicle 10, user interface 22 may further represent physical elements used for manually or semi-manually controlling autonomous vehicle 10. For example, user interface 22 may include one or more steering wheels for controlling a direction of travel of autonomous vehicle 10, one or more pedals for controlling a rate of travel of autonomous vehicle 10, one or more hand brakes, etc.

Autonomous vehicle 10 may further include an autonomous control system 24, which represents a system configured to autonomously operate one or more aspects of vehicle 10 without requiring intervention by an occupant of autonomous vehicle 10. Autonomous control system 24 may include various sensors and units, such as a global positioning system (GPS) unit, one or more accelerometer units, one or more gyroscope units, one or more compass units, one or more radar units, one or more LiDaR (which refers to a Light Detection and Ranging) units, one or more cameras, one or more sensors for measuring various aspects of vehicle 10 (such as a steering wheel torque sensor, steering wheel grip sensor, one or more pedal sensors, tire sensors, tire pressure sensors), and any other type of sensor or unit that may assist in autonomous operation of vehicle 10.

In this respect, autonomous control system 24 may control operation of vehicle 10, allowing the occupant to participate in tasks unrelated to the operation of vehicle 10. As the occupant of autonomous vehicle 10 becomes less involved in the operation of vehicle 10, the occupant may become distracted and/or complacent, spending no more time on driving tasks than is necessary. However, autonomous vehicle 10 may transfer control of vehicle 10 to the occupant when problems occur for which autonomous vehicle 10 is unequipped to handle. The occupant assuming control may be referred to as a "primary occupant" as this occupant is primarily responsible for assuming control when autonomous vehicle 10 may no longer safely autonomously control vehicle 10.

Transitioning control of autonomous vehicle 10 to the primary occupant may occur suddenly, such as when equipment used by autonomous control system 24 fails due to weather, malfunction and the like. Sudden transitions of control to a potentially distracted primary occupant may not give the primary occupant time to regain sufficient context in which to safely operate vehicle 10.

Transferring control may refer to returning responsibility of control to the occupant such that the occupant directs operation of vehicle 10 (e.g., using a steering wheel, pedals and other implements in traditional vehicles, or using various non-traditional interfaces, such as virtual interfaces that allow for acceleration, braking, and steering). Transferring control may also be only a partial transfer of control depending on the circumstances. For example, a sensor allowing for determination of a rate of travel may fail, but all other autonomous control systems for steering and navigation may be operational. In this example, vehicle 10 may transfer control of acceleration and braking but retain control of steering and navigation. As such, vehicle 10 may transfer control of the operation of vehicle 10 when responsibility for one or more autonomously performed operations are transferred to the occupant.

In accordance with various aspects of the techniques described in this disclosure, autonomous vehicle 10 may ensure occupant awareness by, as one example, providing information so that the primary occupant and potentially other occupants may monitor a current driving context should the primary occupant be suddenly put in control of vehicle 10. Such driving context may allow the primary occupant to more safely operate the vehicle upon a transfer of control from autonomous control system 24 to the primary occupant.

In operation, processor 12 may determine an event for which the primary occupant of the vehicle is to be apprised. In the context of autonomous vehicle 10 capable of controlling operation of vehicle 10, processor 12 may determine, when autonomous control system 24 is currently autonomously controlling operation of vehicle 10, that autonomous control system 24 is unable to continue to autonomously control the operation of vehicle 10. When autonomous control system 24 determines that autonomous control of vehicle 10 is no longer feasible (e.g., given a failure of one or more sensors, occurrence of inclement weather, or some other factor that may prevent successful operation of vehicle 10 by autonomous control system 24), autonomous control system 24 may indicate to processor 12 that an expected event is imminent, where such expected event may include some event that will change an operating characteristic (such as whether autonomous control system 24 or the occupant is responsible for control of vehicle 10). The expected event may, as one example, include transfer of control of the operation of vehicle 10 to the primary occupant. The transfer of control event may also be referred to as a "handoff event," where transfer of control from autonomous control system 24 to the primary occupant may be referred to as "handoff."

Autonomous control system 24 may, prior to signaling the handoff event, determine an extent of time remaining until the expected handoff event. Autonomous control system 24 may determine the extent of time based on any number of factors, including one or more of a predicted time until sensor failure impacts autonomous control of vehicle 10, a time until inclement weather is predicted to begin that may impact the operating characteristic, i.e., autonomous control of vehicle 10 in this example, etc. Autonomous control system 24 may, when signaling the handoff event, also indicate to processor 12 the extent of time remaining until an estimated occurrence of the expected handoff event. In this way, processor 12 may determine the extent of time remaining until an estimated occurrence of the expected handoff event.

Processor 12 may next determine a process by which to restore awareness of the operating context of vehicle 10 based on the determined extent of time remaining until the handoff event. In other words, processor 12 may determine a process by which to inform the occupant of the operating context of vehicle 10 based on the determined extent of time remaining until the estimated occurrence of the expected handoff event. Processor 12 may also base determination of the process by which to restore awareness of the operating context of vehicle 10 on additional factors. Processor 12 may, for example, also determine whether the primary occupant will be able to take control of vehicle 10 when the extent of time remaining until the expected handoff event. As another example, processor 12 may determine a level of alertness of the occupant, and/or a condition triggering the expected handoff event. As such, processor 12 may determine the process to inform the occupant of the operating context based on one or more of the determined extent of time remaining until the expected handoff event, whether the primary occupant will be able to take control of vehicle 10 at the time of the estimated occurrence of the expected handoff event, a level of alertness of the occupant, and/or a condition triggering the expected handoff event.

To facilitate determination of the occupant-based additional factors (such as whether the occupant will be able to control vehicle 10, and the level of awareness of the occupant), vehicle 10 may include an occupant tracking unit 26 configured to monitor the occupant. Occupant tracking unit 26 may represent a unit configured to track the primary occupant (and potentially other occupants of vehicle 10) to determine whether the primary occupant will be able to control vehicle 10.

In determining whether the primary occupant will be able to control vehicle 10 at the time of the estimated occurrence of the expected handoff event, occupant tracking unit 26 may determine a level of awareness (or, in other words, an awareness level) of the primary occupant. The awareness level may be indicative of a level of the primary occupant's awareness of the operating context of vehicle 10.

The level of awareness may also be referred to or indicative of a state of the primary occupant. As such, the level of awareness may represent one factor in determining an overall state of the primary occupant. For example, processor 12 may determine an ability of the primary occupant to take over control of the vehicle based on the level of awareness. When the primary occupant is incapacitated due to sleep deprivation (as one example) as determined through eye tracking indicative of repeated lowering of the focus location and nodding of the head, the level of alertness may be a controlling factor in determining that the primary occupant is unable to take over control of vehicle 10 at the time at which the handoff event is determined to occur.

In other words, processor 12 may determine a level of alertness of the primary occupant relative to a threshold alertness level. When the level of alertness is below the threshold alertness level by a determined amount (e.g., 20% or more below the threshold alertness level), processor 12 may determine that the primary occupant is unable to assume control of vehicle 10 within the determined extent of time remaining until the expected handoff event. However, when the level of alertness is within some margin of the threshold alertness level (e.g., within 20% of the threshold alertness level), processor 12 may determine that the primary occupant is able to resume control of vehicle 10 prior to the expected handoff event.

The determined margin as to whether the primary occupant is able to resume control of vehicle 10 prior to the estimated occurrence of the handoff event may vary based on the extent of time remaining until the expected handoff event. That is, processor 12 may determine that the margin is reduced when there is less time remaining until the estimated occurrence of the expected handoff event, and that the margin is increased when there is more time remaining until the estimated occurrence of the expected handoff event. As such, processor 12 may determine the process based on the interplay between the extent of time remaining until the expected handoff event is determined to occur, whether the primary occupant is able to take over control of vehicle 10 prior to the estimated occurrence of the expected handoff event, and whether the primary occupant is determined to be sufficient alert (e.g., the determined level of alertness is within the margin below the alertness threshold level).

To determine the level of awareness, occupant tracking unit 26 may include a camera or other image capture device configured to capture one or more images of the primary occupant. Occupant tracking unit 26 may position the camera (e.g., rotate the camera to a particular azimuth and elevation) to allow capture of the images of the primary occupant as the primary occupant moves about the cabin of vehicle 10.

Using the camera, occupant tracking unit 26 may perform one or more of eye tracking (which may also be referred to as "gaze tracking") with respect to the images depicting the primary occupant. More information on eye tracking can be found in a paper by Krafka et al., entitled "Eye Tracking for Everyone," dated May 5, 2016, and another paper by Kim et al., entitled "Vision-Based Eye-Gaze Tracking for Human Computer Interface," dated Oct. 12-15, 1999.

Generally, eye tracking tracks the movement of the pupil through the use of corneal reflections created by projections of infrared and/or near infrared non-collimated light. As such, occupant tracking unit 26 may include an infrared and/or a near infrared light source to create a bright pupil effect similar to what is commonly known as "red eye" in images. Occupant tracking unit 26 may generally track the primary occupant and then zoom in on the primary occupant's face or eyes to capture images of at least one eye of the occupant while illuminating the eye with the infrared and/or near infrared light source. The extent of the corneal reflection is represented in the images of the eyes of the occupant in terms of brightness. The brightness of the pupil in the image of the eyes indicates how directly the pupil is focused on the infrared and/or near infrared light source, where higher brightness indicates more direct focus. From this brightness of the pupil, the occupant tracking unit 26 may determine the location at which the primary occupant is gazing.

Although occupant tracking unit 26 is described as performing the eye tracking, occupant tracking unit 26 may perform only aspects of the eye tracking described above. For example, occupant tracking unit 26 may generally track the primary occupant, capturing the images of the eyes of the occupant while directing the infrared and/or near infrared light sources in such a manner as to create the corneal reflections. Occupant tracking unit 26 may next provide the images of the eyes of the occupant to processor 12 for determining the level of awareness.

Assuming occupant tracking unit 26 determines the level of alertness, occupant tracking unit 26 may provide the determined level of awareness to processor 12. Based on the level of awareness, processor 12 may determine whether the primary occupant will be able to take control of vehicle 10 at the estimated occurrence of the handoff event.

Although described as determining an extent to which the primary occupant is aware of the operating context (which may also be referred to as the "driving context" in this disclosure) based on an analysis of the eyes and/or head of the primary occupant, processor 12 may base the determination on additional information, including a detected heart rate of the primary occupant, a determined tiredness of the primary occupant (through eye tracking that detects more frequent blinking or a consistent lowering of the determined focus position, primary occupant images that detects yawning, etc.) or any other image analysis and/or sensor signal analysis, including those that assess alcoholic consumption by the primary occupant, etc.

Autonomous control system 24 may also, when indicating the extent of time remaining until an estimated occurrence of the expected handoff event, determine a condition triggering the expected handoff event. For example, autonomous control system 24 may determine a source or condition in terms of whether such condition was detected visually using cameras or via non-visual sensors, such as road sensing sensors, tire sensors, weather sensors, and the like. Autonomous control system 24 may provide the determined condition when specifying the extent of time remaining until the expected handoff event, subsequent and/or prior to providing the extent of time remaining until he handoff event. Processor 12 may receive, and as such determine, that condition triggering the handoff event.

Processor 12 may determine any combination of processes based on the foregoing factors, and perform the determined process to inform the primary occupant (and thereby potentially increase the primary occupant's awareness) of the operating context of vehicle 10. Although described in more detail with respect to FIGS. 2 and 3, processor 12 may as one example determine a process in which vehicle 10 enters a haptic co-piloting mode when that the extent of time until the occurrence of the expected handoff event is within a threshold on the order of tens of seconds, the primary occupant has been determined to be able to take control of vehicle 10, the level of awareness is below a threshold awareness level but within the awareness margin, and the condition triggering the event is non-visual from a sensor that senses an overly rough road condition.

Processor 12 may interface with autonomous control system 24 to enter the haptic co-piloting mode, requesting that the primary occupant place his or her hands on the steering wheel. During the haptic co-piloting mode, autonomous control system 24 may communicate via haptic feedback in the steering wheel the roughness of the road, while also indicating to which side the primary occupant is to manipulate the wheel to continue to travel to a specified destination.

In this respect, various aspect of the techniques set forth in this disclosure may facilitate occupant awareness in autonomous vehicles when the vehicle has automated some aspect of the driving. The techniques may adaptively select a process to inform an occupant of the operating context based on an extent of time remaining until the estimated occurrence of the expected event (and possibly a determination of whether the primary occupant is able to take control of vehicle 10 when the expected handoff event occurs, and/or the determined level of awareness of the primary occupant). Restoration of the operating context may allow the primary occupant to more safely operate the vehicle upon receiving control.

Although described as being performed by processor 12, various aspects of the techniques described in this disclosure may be performed by GPU 14 or a combination of processor 12 and GPU 14. As such, reference to processor 12 above may be understood to refer to one or more processors, which may include processor 12, GPU 14, a combination of processor 12 and GPU 14, or any combination of various processors, some of which may not be shown in the example of FIG. 1.

Furthermore, although described as being performed in the context of vehicle 10 that is capable of autonomous control of the operation of vehicle 10, the techniques described in this disclosure may apply to any type of vehicle whether capable of autonomous control or not. That is, a level one vehicle that cannot autonomously pilot the vehicle may perform the techniques described in this disclosure. As such, the techniques should not be limited to autonomous vehicles.

Figure 2:
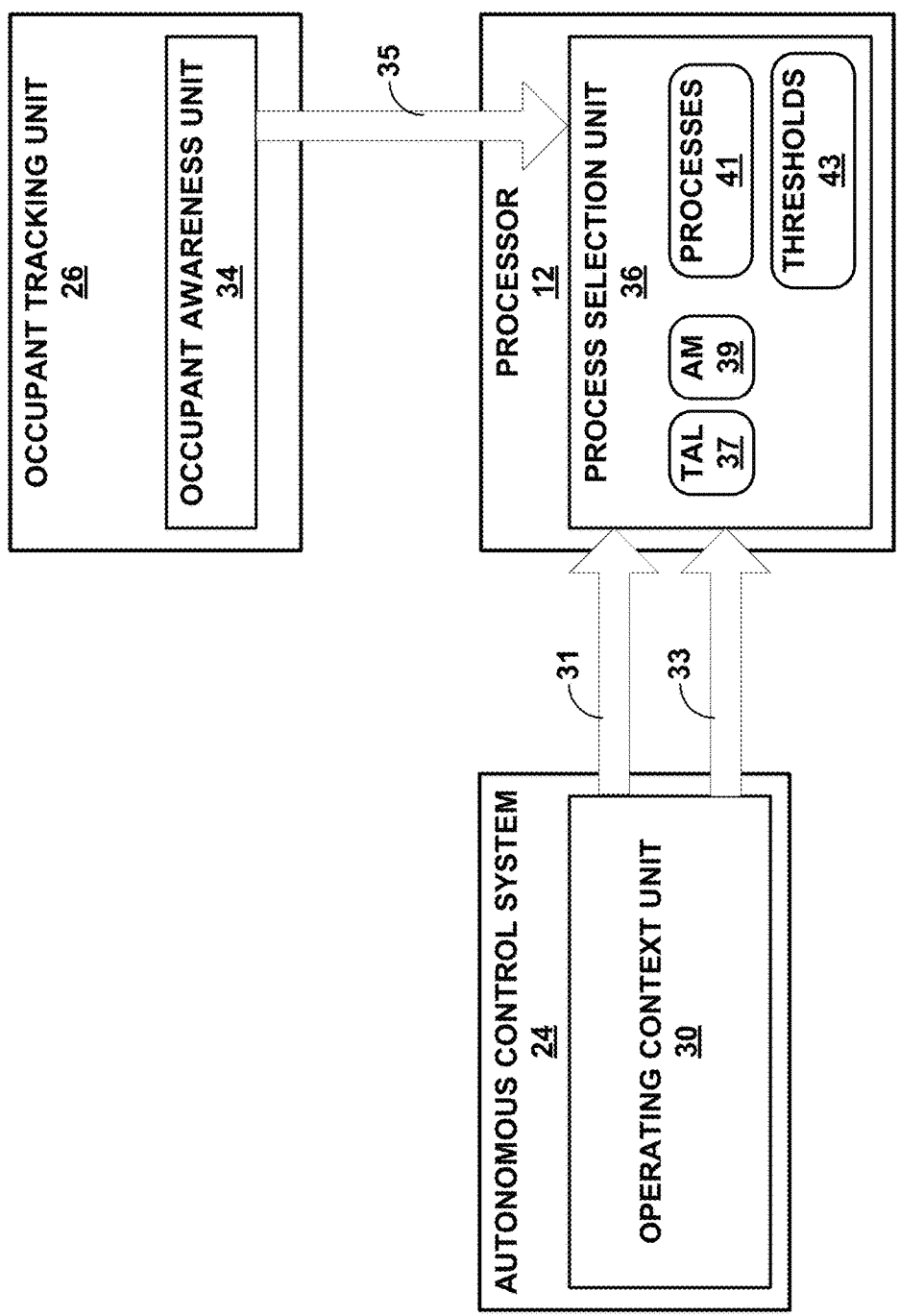
FIG. 2 is a block diagram illustrating various aspects of the vehicle of FIG. 1 in more detail.

FIG. 2 is a block diagram illustrating various aspects of vehicle 10 of FIG. 1 in more detail. In the example of FIG. 2, autonomous control system 24 includes an operating context unit 30. Operating context unit 30 may represent a unit configured to assess the operating context based on input from on-board sensors (including cameras, tire sensors, road condition sensors, weather sensors, etc.) and other information, such as information received via local area networks (LANs), including wireless LANs, cellular networks, inter-vehicle networks or communications, and the like.

For example, operating context unit 30 may accept inputs from the on-board sensors and other information regarding traffic conditions (e.g., identifying an unpredictably operated vehicle), road conditions (e.g., identifying lane closures, falling debris, etc.), and weather (e.g., identifying or predicting severe weather with low visibility). As yet other examples, operating context unit 30 may accept inputs form the on-board sensors and other information regarding vehicle 10 (e.g., identifying communication, system, and/or sensor failures), the occupant (e.g., identifying a medical emergency concerning the primary occupant), and safety system (e.g., identifying potential evacuations, etc.).

Operating context unit 30 may determine the extent of time remaining until the handoff event based on the input form the on-board sensors and the other information (where the input may generally refer to any input from on-board sensors or information from other sources, such as the various networks or communications listed above). Operating context unit 30 may provide the extent of time until the estimated occurrence of the expected handoff event as remaining time information 31 to processor 12. Operating context unit 30 may also provide the condition triggering the handoff event to processor 12 as condition information 33, as well as an indication that the expected handoff event is to occur.

As further shown in the example of FIG. 2, occupant tracking unit 26 may include an occupant awareness unit 34 that represents a unit configured to determine the level of awareness of the primary occupant. Occupant awareness unit 34 may interface with the various sensors (including cameras) that track or otherwise monitor the primary occupant. Occupant awareness unit 34 may receive the eye and head tracking information from an eye and head tracking unit, heart rate information from a heart rate monitoring sensor, respiratory rate from a respiratory rate tracking sensor, and the like and, based on this information, determine that the primary occupant is currently sleeping.

Occupant awareness unit 34 may also utilize historical data tracking the primary occupant to determine, as some examples, a duration that the primary occupant has been sleeping, the current sleep cycle (e.g., deep rapid eye movement (REM) sleep, pre-REM light sleep, etc.) and other aspects of the state of the primary occupant (including consumption of alcoholic beverages) to determine the level of awareness. Occupant awareness unit 34 may provide the determined level of awareness as awareness level information 35 to processor 12.

As also shown in the example of FIG. 2, processor 12 may include a process selection unit 36 that represents a unit configured to select a process to inform the primary occupant of the current operating context of vehicle 10 based on information 31, 33, and 35. Process selection unit 36 may first determine a threshold alertness level 37 ("TAL 37"). In some examples, process selection unit 36 may be configured with a static TAL 37 that does not adapt to the current operating context, and therefore defines a minimum level of awareness of the primary occupant required to operate vehicle 10.

In other examples, process selection unit 36 may adaptively determine TAL 37 based on remaining time information 31, condition information 33 and/or other information (such as the time of day, current weather conditions, current traffic conditions, type of road on which vehicle 10 is operating, etc.). For example, processor 12 may determine that a tire pressure monitoring sensor failure while vehicle 10 is traveling on a relatively remote road having little to no traffic may not require as high as a TAL 37 as failure of a GPS sensor on an interstate having moderate to high traffic levels.

Process selection unit 36 may also determine an awareness margin 39 ("AM 39"). Again, in some examples, process selection unit 36 may be preconfigured with AM 39, where such static AM 39 may represent a largest margin from TAL 37 acceptable for any extent of time remaining until an estimated occurrence of the handoff event. Process selection unit 36 may be configured, for a higher static AM 39, to perform a default process (which may include navigating to the side of the road and stopping or stopping without navigating to the side of the road) for longer extent of time remaining until an estimated occurrence of the handoff event than that configured for a lower static AM 39.

In other words, a higher alertness margin may necessitate more time to ensure awareness, which may result in process selection unit 36 determining that the default process is to be performed when the time to the expected handoff event is at higher levels of time (e.g., tens of seconds or minutes). In contrast, a lower alertness margin may necessitate more less time to ensure awareness, which may result in process selection unit 36 determining that the default process is to be performed when the time to the expected handoff event is at lower levels of time (e.g., seconds rather than tens of seconds, or tens of seconds rather than minutes).

In other examples, process selection unit 36 may adaptively determine AM 39 based on remaining time information 31, determining a higher AM 39 when remaining time information 31 indicates more time until the estimated occurrence of the expected handoff event, and a lower AM 39 when remaining time information 31 indicates less time until the estimated occurrence of the expected handoff event. In this respect, process selection unit 36 may determine AM 39. Process selection unit 36 may after determining TAL 37 and AM 39, perform the algorithm for selection of the process as outlined in more detail with respect to the example of FIG. 3.

Although not shown in the example of FIG. 2, autonomous control system 24 may also include a driver readiness unit that represents a unit configured to prompt the primary occupant for handoff. The driver readiness unit may, when informed that the primary occupant is ready for handoff, perform the handoff of one or more aspects of operation of vehicle 10 to the primary occupant.

Figure 3:
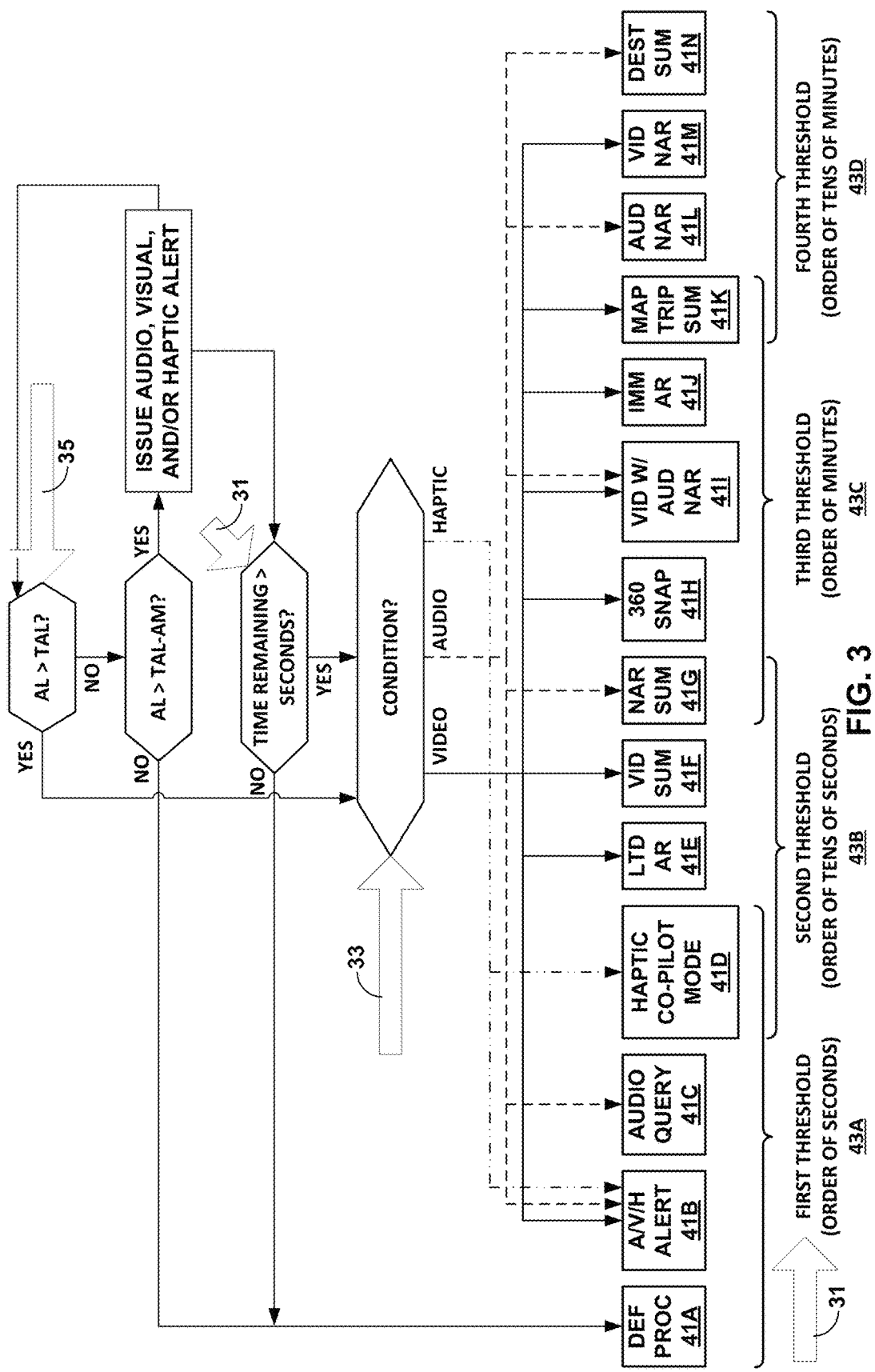
FIG. 3 is a diagram illustrating example operation by the process selection unit shown in FIG. 2 in selecting a process by which to ensure occupant awareness of the operating context of the vehicle of FIG. 1 in accordance with various aspects of the techniques described in this disclosure.

FIG. 3 is a diagram illustrating example operation by process selection unit 36 of FIG. 2 in selecting a process to inform the occupant of the operating context of vehicle 10 in accordance with various aspects of the techniques described in this disclosure. Process selection unit 36 may first compare the awareness level ("AL," which may refer to another way of the level of awareness defined by awareness information 35) to TAL 37. When AL is greater than (or, in some examples, greater than or equal to) TAL 37, process selection unit 36 may determine that the primary occupant is able to control vehicle 10 at the estimated time that the expected handoff event occurs, and is sufficiently alert to operate vehicle 10 once the operating context is restored, and proceed to selection of the process based on condition information 33.

However, when the AL is not greater than (or, in some examples, is not greater than or equal to) TAL 37, process selection unit 36 may determine whether the primary occupant will be able to control vehicle 10 when the expected handoff event occurs by, as one example, comparing the AL to TAL 37 minus AM 39. Process selection unit 36 may determine whether the primary occupant will be able to control vehicle 10 when the expected handoff event occurs but not yet alert enough to current operate vehicle 10 when the AL is greater than TAL 37 minus AM 39 but less than TAL 37.

When the AL is less than TAL 37 but greater than TAL 37 minus AM 39, process selection unit 36 may issue one or more of an audio alert, a video alert, and/or a haptic alert in an attempt to raise the AL of the primary occupant such that the AL is greater than TAL 37. When the AL is less than TAL 37-AM 39, process selection unit 36 may determine that the primary occupant is not able to control vehicle 10 at the time at which the expected handoff event occurs. Responsive to the determination that the primary occupant is not able to control vehicle 10 at the time at which the expected handoff event occurs, process selection unit 36 may select default process 41A ("def proc 41A").

When the AL is less than TAL 37 but greater than TAL 37 minus AM 39 and in conjunction with or after issuing the audio, visual, and/or haptic alerts, process selection unit 36 may determine whether the extent of time remaining until the estimated occurrence of the expected handoff event as indicated by remaining time information 31 is greater than a number of seconds (as defined by a threshold). When the extent of time remaining is not greater than some threshold defined on an order of seconds, process selection unit 36 may determine that there is insufficient time to raise the AL of the primary occupant and determine that default process 41A is to be performed.

When the extent of time remaining is greater than the threshold defined on the order of seconds, process selection unit 36 may select a class of processes 41 (which may refer to all processes by which to ensure occupant awareness) based on condition information 33. Process selection unit 36 may classify various conditions as being better illustrated by way of video, audio, and/or haptic processes 41.

Conditions triggering the expected handoff event that may be better suited to video processes 41 include detecting erratic operation of a vehicle traveling along the same road as vehicle 10, but not in a way that is described or subject to analysis by a translation system of autonomous control system 24. Another example condition that may be better suited to video processes 41 may include instances in which autonomous control system 24 is unable to identify a route around an obstacle, where autonomous control system 24 may be able to generate images and/or video for display that highlights the obstacle and possible paths. Autonomous control system 24 may, in other words, identify conditions in which video or images of the condition triggering the handoff event are available, where the condition cannot be effectively translated from sensor outputs into normal spoken language.

Conditions that are better suited for audio processes 41 include, as one example, when an exit from a highway is arriving shortly and autonomous control system 24 has determined that the expected handoff event is to occur at the arrival of the exit. Another example of a condition suited for audio processes 41 include traffic that is communicated via a communication to autonomous control system 24 via vehicle to vehicle links, where the communication indicates where the traffic occurs (e.g, via GPS coordinates or mile marker) but that does not include any images or video of the traffic. Autonomous control system 24 may, in other words, identify conditions that can be effectively translated from sensor outputs into normal spoken language and/or conditions for which there is insufficient video or images.

Conditions better suited for haptic processes 41 include, as one example, conditions concerning a roughness of the road that may be difficult to communicate visually or verbally. Another example condition better suited for haptic processes 41 include conditions concerning an amount of slippage due to snow or ice on the road, which may be clearly communicated through video or audio processes 41. Autonomous control system 24 may, in this respect, clarify haptic conditions as those that cannot be easily expressed through video or audio processes, but that may be communicated by way of haptics through the steering wheel or seat in which the primary occupant is sitting.

Based on the foregoing condition information 33, process selection unit 36 may select one of processes 41A-41N ("processes 41"). Furthermore, process selection unit 36 may classify processes 41 based on thresholds 43A-43D, which effectively classifies processes 41 into processes suitable for different levels of time (e.g., seconds by way of first threshold 43A, tens of seconds by way of second threshold 43B, minutes by way of third threshold 43C, and tens of minutes by way of fourth threshold 43D).

In the example classification shown in FIG. 3, process selection unit 36 may classify processes 41A-41D as seconds-level processes 41 that may be suitable for restoring primary occupant awareness (by way of, e.g., informing the primary occupant of the operating context) when the time until handoff is on the order of seconds. Audio, video, and/or haptic alert process 41B ("A/V/H alert 41B") may represent a process by which autonomous control system 24 issues an audio, visual, and/or haptic alert to the primary occupant. Process selection unit 36 may select which of the audio, video, and/or haptic alerts to issue based on condition information 33. Audio query process 41C may represent a process by which processor 12 interfaces with user interface 22 to issue an audio query, providing information to the primary occupant. Haptic co-pilot mode process 41D represents a process by which autonomous control system 24 interfaces with user interface 22 to issue haptic feedback via the steering wheel, seat, or other surface with which the primary occupant may interact (including tablets, smart phones or other devices capable of haptic feedback) that directs the primary occupant is controlling operating of vehicle 10.

Process selection unit 36 may select any of seconds-level processes 41 when remaining time information 31 indicates an extent of time remaining until the expected handoff event is below (or, in some examples, below or equal to) first threshold 43A. Process selection unit 36 may select one or more of seconds-level processes 41 based on condition information 33, tailoring selection of seconds-level processes 41 to the condition triggering the handoff event. In the example of FIG. 3, process selection unit 36 may classify default process 41A as condition independent, audio, video, and/or haptic alert process 41B as all of the audio, video and haptic processes, audio query process 41C as an audio process, and haptic co-pilot mode process 41D as a haptic process.

Process selection unit 36 may classify processes 41D-41G as tens-of-seconds-level processes 41 that may be suitable for restoring primary occupant awareness (by way of, e.g., informing the primary occupant of the operating context) when the time until handoff is on the order of tens of seconds. Limited augmented reality process 41E ("LTD AR 41E") may represent a process by which processor 12 and/or autonomous control system 24 may interface with user interface 22 to present limited amounts of augment reality to present, via a heads-up display or headset worn by the primary occupant, a marker around the condition triggering the expected handoff event. Video summary process 41F ("VID SUM 41F") may represent a process by which processor 12 and/or autonomous control system 24 interfaces with user interface 22 to present via display 20 a video summary of the condition triggering the handoff event and/or the operating context of vehicle 10. Narrative summary process 41G ("NAR SUM 41G") may represent a process by which processor 12 and/or autonomous control system 24 interfaces with user interface 22 to present an audio narrative of the condition triggering the expected handoff event and/or the operating context of vehicle 10.

Process selection unit 36 may select any of tens-of-seconds-level processes 41 when remaining time information 31 indicates an extent of time remaining until handoff is below (or, in some examples, below or equal to) second threshold 43B. Process selection unit 36 may select one or more of tens-of-seconds-level processes 41 based on condition information 33, tailoring selection of seconds-level processes 41 to the condition triggering the handoff event. In the example of FIG. 3, process selection unit 36 may classify haptic co-pilot mode process 41D as a haptic process, limited AR process 41E and video summary process 41F as video processes, and narrative summary process 41G as an audio process.

Process selection unit 36 may classify processes 41G-41K as minutes-level processes 41 that may be suitable for restoring primary occupant awareness (by way of, e.g., informing the primary occupant of the operating context) when the time until handoff is on the order of minutes. 360 degree snapshot process 41H ("360 SNAP 41G") may represent a process by which processor 12 and/or autonomous control system 24 may interface with user interface 22 to present via display 20 a 360 degree video or image (which may also be referred to as a "snapshot") of the condition triggering the handoff event and/or the operating context of vehicle 10. Video with audio narration process 41I ("VID W/AUD SUM 41I") may represent a process by which processor 12 and/or autonomous control system 24 interfaces with user interface 22 to present via display 20 a video with real-time or near-real-time audio narration of the condition triggering the handoff event and/or the operating context of vehicle 10. Immersive AR process 41J ("IMM AR 41G") may represent a process by which processor 12 and/or autonomous control system 24 interfaces with user interface 22 to present via display 20 (e.g., a heads-up display or augmented reality headset) an immersive virtual summary of the condition triggering the handoff event and/or the operating context of vehicle 10. Video map trip summary process 41K ("MAP TRIP SUM 41K") may represent a process by which processor 12 and/or autonomous control system 24 interfaces with user interface 22 to present via display 20 a video map-based summary of a trip that vehicle 10 is currently traveling.

Process selection unit 36 may select any of minutes-level processes 41 when remaining time information 31 indicates an extent of time remaining until handoff is below (or, in some examples, below or equal to) third threshold 43C. Process selection unit 36 may select one or more of tens-of-seconds-level processes 41 based on condition information 33, tailoring selection of minutes-level processes 41 to the condition triggering the expected handoff event. In the example of FIG. 3, process selection unit 36 may classify narrative summary process 41G and video with audio narrative process 41I as an audio process, and 360 snapshot process 41H, video with audio narrative process 41I, immersive AR 41J, and map-based trip summary process 41K as video processes.

Process selection unit 36 may classify processes 41K-41N as tens-of-minutes-level processes 41 that may be suitable for restoring primary occupant awareness (by way of, e.g., informing the primary occupant of the operating context) when the time until the expected handoff event is on the order of tens of minutes. Audio narrative process 41L ("AUD NAR 41L") may represent a process by which processor 12 and/or autonomous control system 24 may interface with user interface 22 to provide an audio narration of the condition triggering the handoff event and/or the operating context of vehicle 10. Video narrative process 41M ("VID NAR 41M") may represent a process by which processor 12 and/or autonomous control system 24 interfaces with user interface 22 to present via display 20 a video narration of the condition triggering the handoff event and/or the operating context of vehicle 10. Destination summary process 41N ("DEST SUM 41N") may represent a process by which processor 12 and/or autonomous control system 24 interfaces with user interface 22 to present an audio destination-based summary of a trip that vehicle 10 is currently configured to perform.

Process selection unit 36 may select any of tens-of-minutes-level processes 41 when remaining time information 31 indicates an extent of time remaining until the expected handoff event is below (or, in some examples, below or equal to) fourth threshold 43D. Process selection unit 36 may select one or more of tens-of-seconds-level processes 41 based on condition information 33, tailoring selection of tens-of-minutes-level processes 41 to the condition triggering the expected handoff event. In the example of FIG. 3, process selection unit 36 may classify map-based trip summary process 41K and video narrative process 41M as an audio process, and audio narrative process 41L and destination-based audio summary process 41N as audio processes.

As noted above, process selection unit 36 may classify various processes 41 into two (or possibly more) time-based classes. For example, process selection unit 36 may classify haptic co-pilot mode process 41D as belonging to seconds-level processes 41 and tens-of-seconds level processes 41. Such overlapping classification suggests that each of thresholds 43 may include both an upper bound and a lower bound (or be defined in terms of a range) that may overlap adjacent thresholds. Processor selection unit 36 may, in this way, define thresholds 43 as a range having an upper bound and a lower bound in which various processes 41 may be classified. Those of processes 41 having an expected duration that falls within the overlapping portions of the ranges of threshold 43 may be included in two or possibly more classes. Accordingly, the techniques of this disclosure should not be limited in this respect to a binary or single classification system in which processes 41 are only classified into one, and only one, class.

Moreover, within each of the time-based and condition-based classifications, process selection unit 36 may further distinguish between the sub-classes of processes 41 based on a state of the occupant. That is, while shown as only issuing an audio, visual, and/or haptic alert when AL is less than TAL 37, but greater than TAL 37 minus AM 39, process selection unit 36 may perform various of processes 41 in the various above identified classes of processors 41.

The following Tables 1-3 illustrate an example of how process selection unit 41 may select processes when AL is greater than TAL 37 (denoted as "Occupant alert and able to take control), when AL is less than TAL 37 but greater than TAL 37 minus AM 39 (denoted as "Occupant not alert but will be able to take control"), and when AL is less than TAL 37 minus AM 39 (denoted as "Occupant is not able to take control").

TABLE 1

| Occupant alert and able to take control | |
|---|---|
| Time Remaining until Handoff | Occupant alert and able to take control |
| Within one second | Default process 41A |
| Within several seconds | Audio Query 41C |
| | Audio Alert 41B |
| | Haptic Alert 41B |
| | Haptic co-piloting 41D (hands on the wheel) |
| | Limited AR (e.g. AR marker around problem area on head's up display - not shown in FIG. 3) |
| Within in 10 s of seconds | Short or sped-up video summary 41F |
| | Narrated summary 41G |
| | Short or sped-up first-person video 41F |
| | Can use opaque display (Not shown in FIG. 3) |

TABLE 1-continued

Occupant alert and able to take control

| Time Remaining until Handoff | Occupant alert and able to take control |
|---|---|
| Within several minutes | 360 snapshot displays 41H (Not shown in FIG. 3) Video at real-time with audio narration 41I Immersive AR 41J |
| Within 10 s of minutes | Map-based display summary of trip 41K Audio Narrative 41L Video Narrative 41M Destination summary 41N |

TABLE 2

Occupant not alert but will be able to take control

| Time Remaining until Handoff | Occupant not alert but will be able to take control |
|---|---|
| Within one second | Default process 41A |
| Within several seconds | Audio Alert 41B Haptic Alert 41B |
| Within in 10 s of seconds | Audio Query 41C (not shown in FIG. 3) Short or sped-up video summary 41F Narrated summary 41G Haptic co-piloting (hands on the wheel) 41D Limited AR 41E (e.g. AR marker around problem area on heads up display) |
| Within several minutes | Short or sped-up first-person video 41I Immersive AR 41J Can use opaque display (not shown in FIG. 3) 360 snapshot display 41H |
| Within 10 s of minutes | Video at real-time with audio narration (not shown in FIG. 3) Map-based display summary of trip 41K Audio Narrative 41L Video Narrative 41M |

TABLE 3

Occupant not able to take control

| Time Remaining until Handoff | Occupant not able to take control |
|---|---|
| Within one second | Default process 41A |
| Within several seconds | Default process 41A |
| Within in 10 s of seconds | |
| Within several minutes | |
| Within 10 s of minutes | |

The foregoing Tables 1 and 2 show how process selection unit 36 may select various different second-level processes 41, tens-of-seconds-level processes 41, minutes-level processes 41, and tens-of-minutes-level processes 41 may be classified based on whether AL is greater than TAL 37, less than TAL 37 but greater than TAL 37 minus AM 39, and less than TAL 37 minus AM 39. Although described in this disclosure with respect to certain time-based classifications, the techniques may be performed with respect to other time- or duration-based classifications that vary by orders of magnitude, or other durations.

Figure 4:
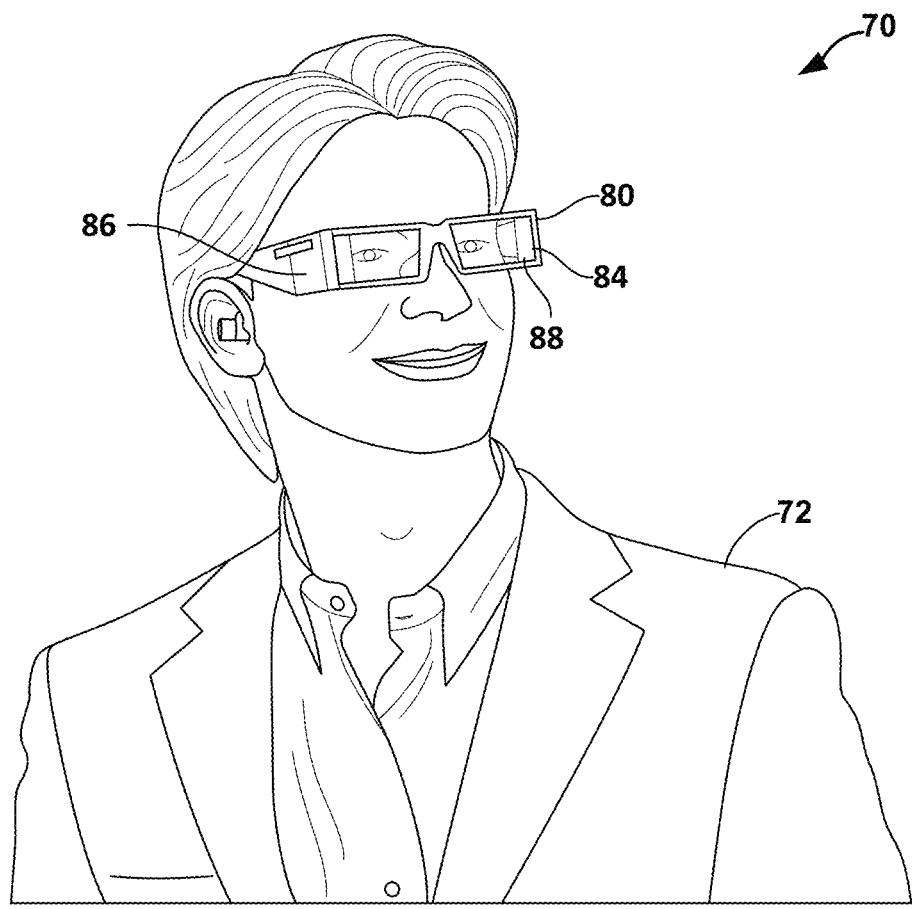
FIG. 4 is a diagram illustrating an example of a head-mounted display system configured to perform various aspects of the techniques described in this disclosure.

FIG. 4 is a diagram illustrating an example of a head-mounted display system 70 configured to perform various aspects of the techniques described in this disclosure. Head-mounted display (HMD) system 70 includes an HMD 80 that can be worn by occupant 72, which may represent one or more of primary occupant 61A or secondary occupant 61B. HMD 80 may be configured to be worn by occupant 72, e.g., similar to a pair of glasses, with a frame 84 having arms 86 extending from lens holders 88. HMD 80 is configured to communicate wireless with vehicle 10 and may act as an extension of user interface 22.

In some examples, HMD 80 may include a processor separate from processor 12 along with system memory, a GPU, and other computing components separate from those of vehicle 10 described above with respect to the example of FIG. 1. In other examples, HMD 80 may simply constitute an extension of display 20, where processor 12 and/or autonomous control system 24 may interface with HMD 80 to perform various of the AR processes noted above, such as limited AR process 41E and immersive AR process 41J.

Figure 5B:
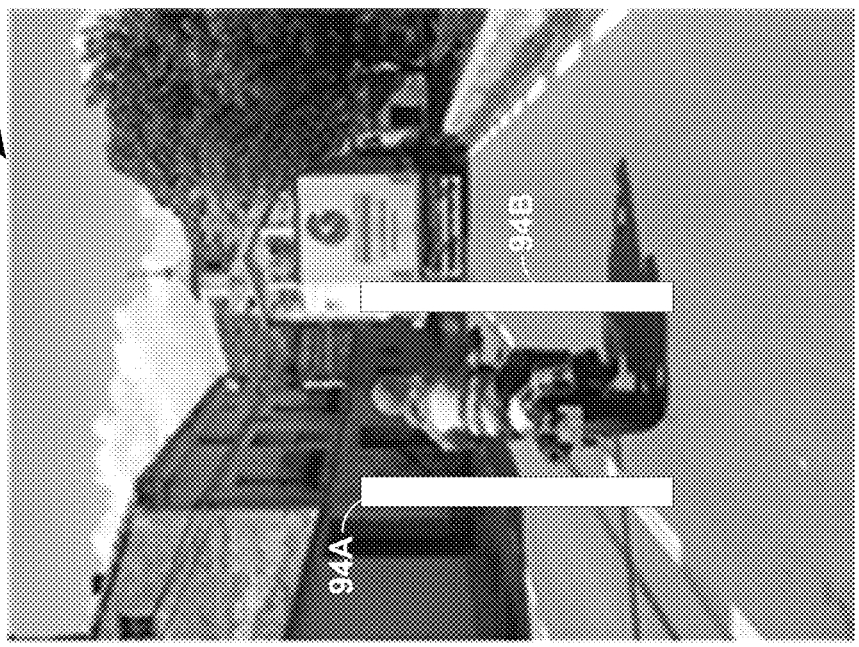
FIGS. 5A and 5B are diagrams showing example forward views having different levels of emphasis applied in accordance with various aspects of the techniques described in this disclosure.
Figure 5A:
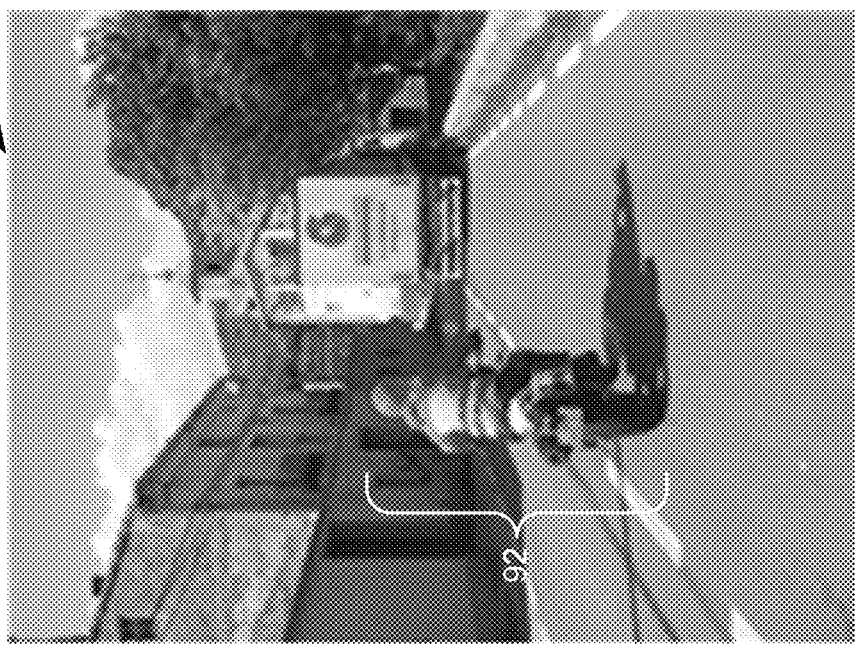

FIGS. 5A and 5B are diagrams showing example forward views 90A and 90B having different levels of emphasis applied in accordance with various aspects of the techniques described in this disclosure. Forward views 90A and 90B may represent either images of forward views or actual forward views viewed through HMD 80.

In the example of FIG. 5A, forward view 90A does not include any emphasis and, therefore, represents a forward view free of augmentation by way of virtual objects. Forward view 90A shows a small vehicle (e.g., motorcycle 92, where the bracket denoting motorcycle 92 is not displayed on the screen and is used only for reader reference) that is in the same lane as vehicle 10 and which vehicle 10 is following. In the example of FIG. 5B, forward view 90B is the same or substantially the same as forward view 90A except that forward view 90B includes two minor virtual objects 94A and 94B presented by HMD 80 to emphasize a condition, e.g., the presence of vehicle 92 that is driving erratically, that triggered the upcoming handoff event.

Figure 6:
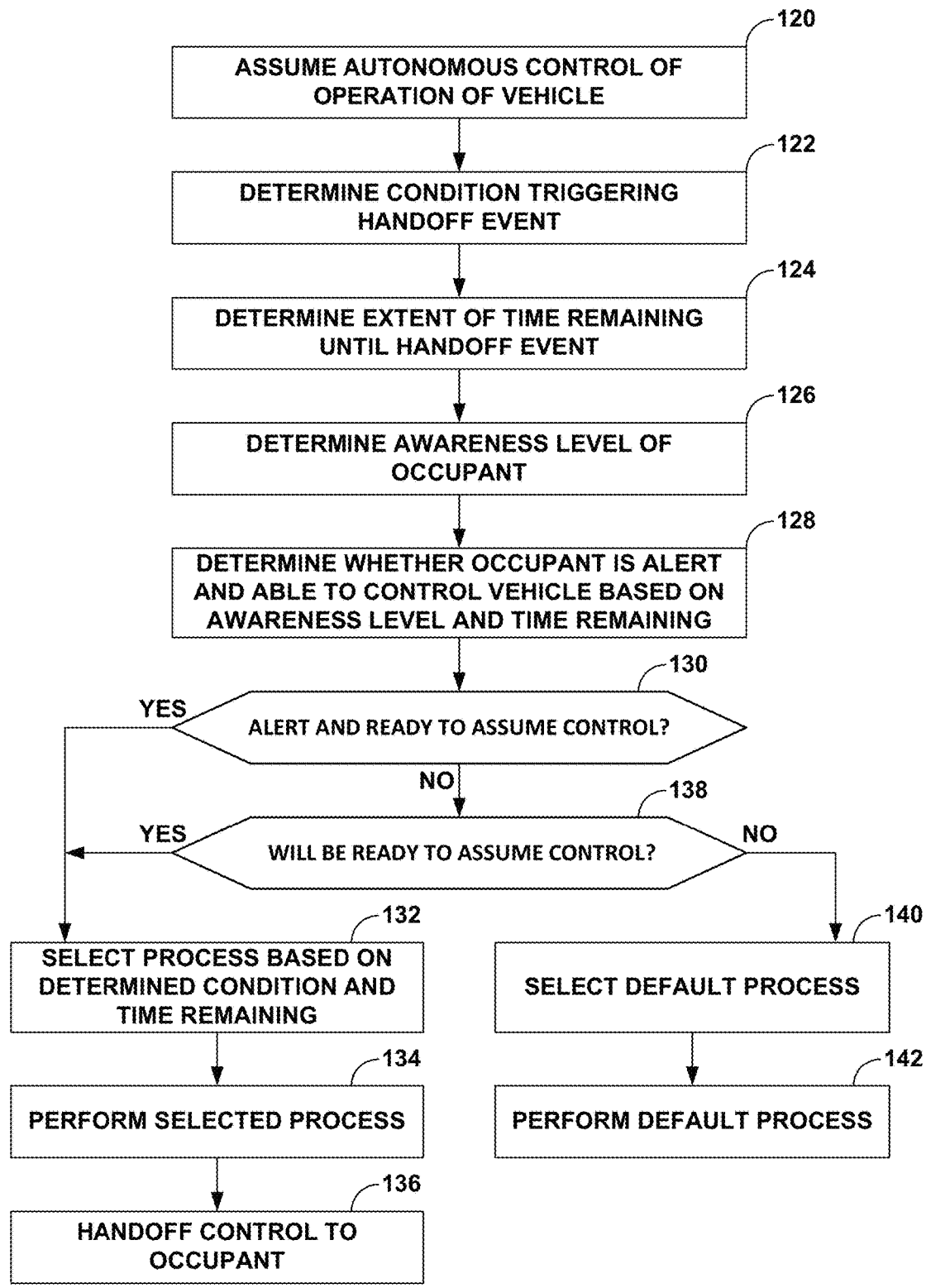
FIG. 6 is a flowchart illustrating example operation of the vehicle of FIG. 1 in performing various aspects of the techniques described in this disclosure.

FIG. 6 is a flowchart illustrating example operation of vehicle 10 of FIG. 1 in performing various aspects of the techniques described in this disclosure. Initially, autonomous control system 24 of vehicle 10 may assume autonomous control of operation of vehicle 10 (120).

After assuming autonomous control of operation of vehicle 10 (or in some instances prior to assuming autonomous control of operation of vehicle 10), processor 12 may interface with autonomous control system 24 to determine a condition triggering a expected handoff event (which again may refer to transferring one or more aspects of control of operation of vehicle 10 from autonomous control system 24 to the primary occupant) (122). Processor 12 may also interface with autonomous control system 24 to determine an extent of time remaining until the expected handoff event (124). Processor 12 may next interface with occupant tracking unit 26 to determine an awareness level of an occupant of vehicle 10 (126).

Processor 12 may next determine whether the occupant is alert and able to control vehicle 10 based on the determined awareness level and the determined time remaining until the expected handoff event (128). When processor 12 determines that the occupant is alert and able to control vehicle 10 ("YES" 130), processor 12 may select one of processes 41 based on the determined condition and the time remaining until the expected handoff event (132). Processor 12 may interface with user interface 22 to perform the selected one of processes 41, and after performing the selected one of processes 41, handoff control to the occupant (134, 136).

When processor 12 determines that the occupant is not alert, and as such not ready to assume control of vehicle 10 ("NO" 130), processor 12 may determine whether the occupant will be able to assume control of vehicle 10 within the time remaining until the expected handoff event (138). When the occupant will be ready to assume control ("YES" 138"), processor 12 may select one of processes 41 based on the determined condition and the time remaining until the expected handoff event (132). Processor 12 may interface with user interface 22 to perform the selected one of processes 41, and after performing the selected one of processes 41, handoff control to the occupant (134, 136).

When processor 12 determines that the occupant will not be ready to assume control of vehicle 10 in the time remaining until the expected handoff event ("NO" 138), processor 12 may select a default process of processes 41 (140). Processor 12 may next perform the default process without performing handoff (142).

Again, performing handoff (or, in other words, transferring control) may refer to returning responsibility of control to the occupant such that the occupant directs operation of vehicle 10 (e.g., using a steering wheel, pedals and other implements in traditional vehicles, or using various non-traditional interfaces, such as virtual interfaces that allow for acceleration, braking, and steering). Transferring control may also be only a partial transfer of control depending on the circumstances. For example, a sensor allowing for determination of a rate of travel may fail, but all other autonomous control systems for steering and navigation may be operational. In this example, vehicle 10 may transfer control of acceleration and braking but retain control of steering and navigation. As such, vehicle 10 may transfer control of the operation of vehicle 10 when responsibility for one or more autonomously performed operations are transferred to the occupant.

Although various aspects of the techniques are described as being performed by vehicle 10, various aspects of the techniques may be performed by other devices with the results provided via a communication protocol to vehicle 10. That is, image or video analysis of contextual images, gaze or eye tracking, occupant tracking, any image or video mixing (e.g., to form the composite image), and transparency determination for the contextual images to provide a few examples may be performed by another vehicle, network servers or computer server farms (that is, by the "cloud") having processors and/or GPUs in place of those or in addition to those of vehicle 10. As such, the techniques should not be limited to being directly performed by the vehicle itself.

Figure 7:
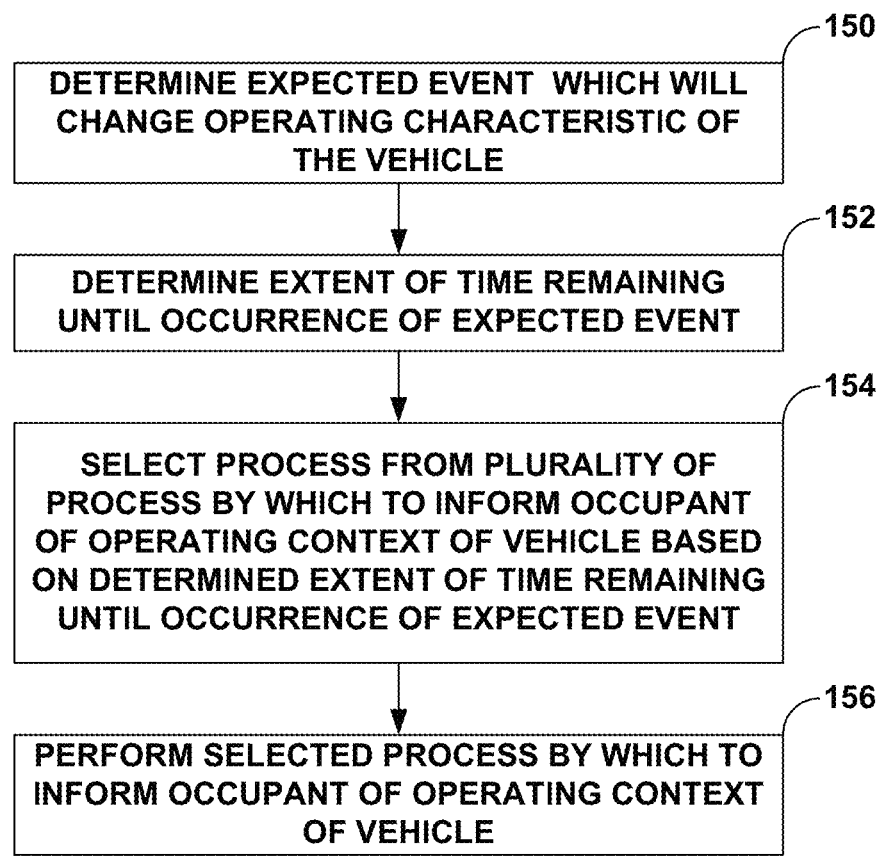
FIG. 7 is another flowchart illustrating example operation of the vehicle of FIG. 1 in performing various aspects of the techniques described in this disclosure.

FIG. 7 is a flowchart illustrating example operation of vehicle 10 in performing various aspects of the techniques described in this disclosure. Processor 12 of vehicle 10 may first determine an expected event which will change an operating characteristic of vehicle 10 (150). One example of the expected event which will change the operating characteristic of vehicle 10 is detecting that transfer of control from autonomous control system 24 to the primary occupant is to occur, which is referred to in this disclosure as an "expected handoff event."

Processor 12 may next determine an extent of time remaining until the estimated occurrence of the expected event, and select a process of a plurality of processes by which to inform the occupant of an operating context of vehicle 10 based on the determined extent of time remaining until an estimated occurrence of the expected event (152, 154). Processor 12 may next interface with user interface 22 and/or autonomous control system 24 to perform the process by which to inform the occupant of the operating context of vehicle 10 (156).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of providing information to ensure occupant awareness in a vehicle, the method comprising:
   autonomously controlling, by the vehicle, operation of the vehicle;
   determining, by one or more processors and concurrent with the vehicle autonomously controlling operation of the vehicle, an expected event is to occur, the expected event including transfer of control of the operation of the vehicle from the vehicle to an occupant;
   determining, by the one or more processors and concurrent with the vehicle autonomously controlling operation of the vehicle, an extent of time remaining until an estimated occurrence of the expected event;
   determining, by the one or more processors and concurrent with the vehicle autonomously controlling operation of the vehicle, a condition that triggers the expected event;
   selecting, by the one or more processors and concurrent with the vehicle autonomously controlling operation of the vehicle, a process of a plurality of processes by which to inform the occupant of an operating context of the vehicle such that the process of the plurality of processes is capable of being performed within the determined extent of time, wherein a first subset of the plurality of processes are for higher levels of the determined extent of time compared to a second subset of the plurality of processes; and
   performing, by the one or more processors and within the determined extent of time, the process of the plurality of processes by which to inform the occupant of the operating context of the vehicle.

2. The method of claim 1, further comprising determining a state of the occupant,
   wherein selecting the process of the plurality of processes comprises selecting the process from the plurality of processes based on the determined extent of time remaining until the estimated occurrence of the expected event, the determined condition, and the state of the occupant.

3. The method of claim 2,
   wherein determining the state of the occupant comprises determining a level of awareness of the occupant, and
   wherein selecting the process of the plurality of processes comprises selecting the process from the plurality of processes based on the determined extent of time remaining until the estimated occurrence of the expected event, the determined condition, and the level of awareness of the occupant.

4. The method of claim 1,
   wherein determining the condition comprises classifying the condition as being for communication via one or more audio processes of the plurality of processes, video processes of the plurality of process, and haptic processes of the plurality of processes, and
   wherein selecting the process of the plurality of processes comprises selecting an audio process of the audio processes capable of apprising the occupant of the operating context within the determined extent of time remaining until the estimated occurrence of the expected event, a video process from the video processes capable of apprising the occupant of the operating context within the determined extent of time remaining until the estimated occurrence of the expected event, and a haptic process of the haptic process capable of apprising the occupant of the operating context within the determined extent of time remaining until the estimated occurrence of the expected event.

5. The method of claim 1, wherein selecting the process of the plurality of processes comprises:
   selecting, based on the extent of time remaining until the estimated occurrence of the expected event and the determined condition, one of seconds-level processes capable of informing the occupant of the operating context within seconds, one of tens-of-seconds-level processes capable of informing the occupant of the operating context within tens of seconds, one of minutes-level processes capable of informing the occupant of the operating context within minutes, or one of tens-of-minutes-level process capable of informing the occupant of the operating context within tens of minutes; and
   selecting the process of the plurality of processes from the selected one of the second-level processes, the tens-of-seconds-level process, the minutes-level processes, or the tens-of-minutes-level process.

6. The method of claim 1, further comprising:
   determining whether the occupant will be able to take control of the vehicle when the extent of time remaining until the estimated occurrence of the transfer of the control of the operation of the vehicle to the occupant occurs; and
   determining a level of alertness of the occupant, and
   wherein selecting the process of the plurality of processes comprises determining the process based on the determined extent of time remaining until the estimated occurrence of the transfer of the control of the operation of the vehicle to the occupant, the determined condition, the determination of whether the occupant will be able to take control of the vehicle, and the determined level of alertness.

7. The method of claim 1, further comprising determining whether the occupant will be able to take control of the vehicle when the extent of time remaining until the estimated occurrence of the transfer of the control of the operation of the vehicle to the occupant occurs,
   wherein selecting the process of the plurality of processes comprises determining, in response to determining that the occupant will not be able to take control of the vehicle, a default action to be performed autonomously by the vehicle, and
   wherein performing the process comprises autonomously performing the default action.

8. The method of claim 7, wherein the default action comprises one of navigating to a side of a road on which the vehicle is traveling and stopping the vehicle, or stopping the vehicle.

9. The method of claim 1, wherein the process of the plurality of processes comprises displaying a destination summary of a trip for which the vehicle is currently autonomously controlling operation of the vehicle.

10. The method of claim 1, wherein the process of the plurality of processes comprises issuing one or more of an audio alert, issuing a haptic alert, entering a haptic co-piloting mode, and providing augmented reality assistance.

11. The method of claim 1, wherein the process of the plurality of processes comprises one or more of displaying a short or sped-up video summary of the operating context, providing a narrated summary of the operating context, displaying a short or sped-up first-person video of the operating context, utilizing an opaque display to highlight problems or show the operating context, and displaying a 360 degree image of the operating context.

12. The method of claim 1, wherein the process of the plurality of processes comprises one or more of presenting real-time and near-real-time video of the operating context.

13. The method of claim 1, wherein the process of the plurality of processes comprises one or more of displaying a map-based summary of a trip for which the vehicle is currently autonomously controlling operation of the vehicle, presenting an audio narrative of the operating context, and presenting a video narrative of the operating context is to be performed.

14. A device configured to provide information to ensure occupant awareness in a vehicle, the device comprising:
one or more processors configured to:
autonomously control operation of the vehicle;
determine, concurrent with the one or more processors autonomously controlling operation of the vehicle, an expected event is to occur, the expected vent including transfer of control of the operation of the vehicle form the vehicle to an occupant;
determine, concurrent with the one or more processors autonomously controlling operation of the vehicle, an extent of time remaining until an estimated occurrence of the expected event;
determine, concurrent with the one or more processors autonomously controlling operation of the vehicle, a condition that triggers the expected event;
determine, concurrent with the one or more processors autonomously controlling operation of the vehicle, a process of a plurality of processes by which to inform the occupant of an operating context of the vehicle such that the process of the plurality of processes is capable of being performed within the determined extent of time, wherein a first subset of the plurality of processes are for higher levels of the determined extent of compared to a second subset of the plurality of processes; and
perform, within the determined extent of time, the process of the plurality of processes by which to inform the occupant of the operating context of the vehicle; and
a memory configured to store the process.

15. The device of claim 14,
wherein the one or more processors are further configured to determine a state of the occupant, and
wherein the one or more processors are configured to select the process from the plurality of processes based on the determined extent of time remaining until the estimated occurrence of the expected event, the determined condition, and the state of the occupant.

16. The device of claim 14, wherein the one or more processors are configured to: determine a level of awareness of the occupant, and
select the process from the plurality of processes based on the determined extent of time remaining until the estimated occurrence of the expected event, the determined condition, and the level of awareness of the occupant.

17. The device of claim 14, wherein the one or more processors are configured to:
classify the condition as being for communication via one or more classified audio processes of the plurality of processes, classified video processes of the plurality of process, and classified haptic processes of the plurality of processes, and select an audio process of the audio process capable of apprising the occupant of the operating context within the determined extent of time remaining until the estimated occurrence of the expected event, a video process from the video processes capable of apprising the occupant of the operating context within the determined extent of time remaining until the estimated occurrence of the expected event, and a haptic process of the haptic process capable of apprising the occupant of the operating context within the determined extent of time remaining until the estimated occurrence of the expected event.

18. The device of claim 14, wherein the one or more processors are configured to:
select, based on the extent of time remaining until the estimated occurrence of the expected event and the determined condition, one of seconds-level processes capable of informing the occupant of the operating context within seconds, one of tens-of-seconds-level processes capable of informing the occupant of the operating context within tens of seconds, one of minutes-level processes capable of informing the occupant of the operating context within minutes, or one of tens-of-minutes-level process capable of informing the occupant of the operating context within tens of minutes; and
select the process of the plurality of processes from the selected one of the second-level processes, the tens-of-seconds-level process, the minutes-level processes, or the tens-of-minutes-level process.

19. The device of claim 14,
wherein the one or more processors are further configured to:
determine whether the occupant will be able to take control of the vehicle when the extent of time remaining until the estimated occurrence of the transfer of the control of the operation of the vehicle to the occupant occurs; and
determine a level of alertness of the occupant, and
wherein the one or more processors are configured to select the process of the plurality of processes based on the determined extent of time remaining until the estimated occurrence of the transfer of the control of the operation of the vehicle to the occupant, the determined condition, the determination of whether the occupant will be able to take control of the vehicle, and the determined level of alertness.

20. The device of claim 14,
wherein the one or more processors are further configured to determine whether the occupant will be able to take control of the vehicle when the extent of time remaining until the estimated occurrence of the transfer of the control of the operation of the vehicle to the occupant occurs,
wherein the one or more processors are configured to:
determine, in response to determining that the occupant will not be able to take control of the vehicle, a default action to be performed autonomously by the vehicle, and
autonomously perform the default action.

21. The device of claim 20, wherein the default action comprises one of navigating to a side of a road on which the vehicle is traveling and stopping the vehicle, or stopping the vehicle.

22. The device of claim 14, wherein the process of the plurality of processes comprises one of displaying a destination summary of a trip for which the vehicle is currently autonomously controlling operation of the vehicle, issuing an audio alert, issuing a haptic alert, entering a haptic co-piloting mode, providing augmented reality assistance, displaying a short or sped-up video summary of the operating context, providing a narrated summary of the operating context, displaying a short or sped-up first-person video of the operating context, utilizing an opaque display to highlight problems or show the operating context, displaying a 360 degree image of the operating context, presenting real-time or near-real-time video of the operating context, displaying a map-based summary of a trip for which the vehicle is currently autonomously controlling operation of the vehicle, presenting an audio narrative of the operating context, or presenting a video narrative of the operating context is to be performed.

23. A device configured to provide information to ensure occupant awareness in a vehicle, the device comprising:
means for autonomously controlling operation of the vehicle;
means for determining, concurrent with autonomous control of the operation of the vehicle, an expected event is to occur, the expected event including transfer of control of the operation of the vehicle from the vehicle to an occupant;
means for determining, concurrent with autonomous control of the operation of the vehicle, an extent of time remaining until an estimated occurrence of the expected event;
means for determining, concurrent with the vehicle autonomously controlling operation of the vehicle, a condition that triggers the expected event including transfer of the control of the operation of the vehicle to the occupant;
means for determining, concurrent with autonomous control of the operation of the vehicle, a process of a plurality of processes by which to inform the occupant of an operating context of the vehicle such that the process of the plurality of processes is capable of being performed within the determined extent of time, wherein a first subset of the plurality of processes are for higher levels of the determined extent of compared to a second subset of the plurality of processes; and
means for performing, within the determined extent of time, the process of the plurality of processes by which to inform the occupant of the operating context of the vehicle.

24. A non-transitory computer-readable storage medium having stored thereon instructions that, when executed, cause one or more processors to:
autonomously control operation of a vehicle;
determine, concurrent with the vehicle autonomously controlling operation of the vehicle, an expected event is to occur, the expected event including transfer of control of the operation of the vehicle from the vehicle to an occupant;
determine, concurrent with the vehicle autonomously controlling operation of the vehicle, a condition that triggers the expected event including transfer of the control of the operation of the vehicle to the occupant;
determine, concurrent with the vehicle autonomously controlling operation of the vehicle, a condition that triggers the expected event including transfer of the control of the operation of the vehicle to the occupant;
determine, concurrent with the vehicle autonomously controlling operation of the vehicle, a process of a plurality of processes by which to inform the occupant of an operating context of the vehicle such that the process of the plurality of processes is capable of being performed within the determined extent of time, wherein a first subset of the plurality of processes are for higher levels of the determined extent of compared to a second subset of the plurality of processes; and
perform, within the extent of time remaining until the estimated occurrence of the expected event, the process of the plurality of processes by which to inform the occupant of the operating context of the vehicle.

* * * * *